Patented Mar. 12, 1940

2,193,650

UNITED STATES PATENT OFFICE 2,193,650

ANTIOXIDANT

Waldo L. Semon, Silver Lake, Ohio, assignor to The B. F. Goodrich Company, New York, N. Y., a corporation of New York No Drawing. Application March 18, 1937, Serial No. 131,654

14 Claims. (Cl. 260—800)

This invention relates to the art of preserving rubber and similar materials against unduly rapid deterioration due to oxidation and the like.

It is well known that many organic substances undergo a more or less rapid deterioration which is commonly ascribed to the action of atmospheric oxygen. It has heretofore been proposed to retard or inhibit this deterioration by adding a small proportion of a phenol, an aromatic base, or some other like substance, termed generally an "antioxidant".

I have discovered a new class of antioxidants which are very effective in retarding the deterioration of rubber and similar materials. This new class of substances includes generally double compounds of an acridine and a secondary aromatic amine. These double compounds conform to the general structural formula

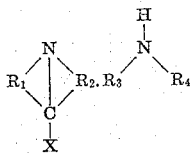

where $R_1$, $R_2$, $R_3$, and $R_4$ represent carbon rings, X is a hydrogen or hydrocarbon radical, and the $R_3$ and $R_4$ may, if desired, be connected by a saturated carbon bridge ortho to the nitrogen and containing either in the bridge itself or in a side chain more than one carbon atom. The carbon rings $R_1$ and $R_2$ may be benzene rings, or may be naphthalene or other condensed ring nuclei. While acidic groups tend to destroy the basic character of the compounds and diminish or destroy their antioxidant activity, substantially neutral or basic groups such as hydrocarbon groups, oxy groups (including hydroxy, alkoxy, and aryloxy) and amino groups (including alkylamino and arylamino) may be substituted on the carbon rings. Hydrocarbon groups such as methyl, ethyl, propyl, isopropyl, butyl, amyl, isopropenyl, isobutenyl, xenyl, benzyl, cyclohexyl, phenyl, tolyl, cumyl, naphthyl and the like may be substituted on any of the carbon atoms.

The acridine part of the double compound always contains a tertiary nitrogen atom. It may consist of acridine, meso-methyl acridine, meso-ethyl naphthacridine, p,p',meso-trimethyl acridine, and similar compounds.

The second part of the double compound always contains a secondary nitrogen atom. It may consist of diphenyl amine, phenyl cumylamine, phenyl xenylamine, phenyl naphthylamine, p,p'-dimethoxy diphenyl amine, etc. It may also consist of an acridane, which is of the secondary aromatic amine type in that it contains a single amino nitrogen atom attached to nuclear carbon atoms of two carbon rings, but in which the two rings are also joined by a carbon bridge ortho to the nitrogen. Thus, the second part may consist of meso-methyl acridane, meso,meso-dimethyl acridane, meso,meso-diethyl dinaphthacridane, p,p'-diethoxy mesophenyl acridane, p,p',meso,meso-tetramethyl acridane, o-imino dibenzyl, etc.

The compounds of this invention may be made by dissolving equimolar quantities of the two materials in a suitable solvent and recovering the double compound. When a mol of acridine is mixed with a mol of diphenyl amine and dissolved in boiling hexane, the product which crystallizes upon cooling is a yellow double compound melting at 84°–86° C. By a similar procedure, I may make meso-methyl acridine · diphenyl amine melting at 98°–100° C., acridine · meso,-meso-dimethyl acridane melting at 133°–134° C., meso-methyl acridine · meso-methyl acridane melting at 99°–100° C., meso-methylacridine · meso,meso-dimethylacridane melting at 125° C. etc.

As an illustration of one manner of employing the antioxidants, a typical tire tread composition is prepared containing 100 parts by weight of rubber, 5.5 parts of sulphur, 30 parts of zinc oxide, 40 parts of gas black, 10 parts of mineral rubber, 5 parts of palm oil, 0.75 part of hexamethylene tetramine, and 0.95 part (0.5% of the weight of the composition) of meso-methyl acridine · diphenyl amine. This composition is vulcanized in a mold for 45 minutes at 294° F. to produce an optimum cure. It is found to deteriorate only from one-third to one-half as rapidly as the same composition without antioxidant, when submitted to the usual accelerated aging tests such as the Geer oven test and the Bierer-Davis bomb test. It was also found that this antioxidant was particularly effective in reducing the tendency of rubber to develop fatigue crack upon rapidly repeated flexing. Even better results were obtained with meso-methyl acridine · meso,meso-dimethyl acridane, particularly in the flexing test.

The double compounds of my invention are much better for use in rubber than their components used separately. The acridines as a class are poor antioxidants, and are difficultly incorporated into rubber. Diphenyl amine is a fair antioxidant, but because of its low melting point (53° C.) it has a marked tendency to evaporate from the rubber. But the compound acridine · diphenyl amine is a stable compound with a much higher melting point than diphenyl amine, it is more easily incorporated into rubber than acridine, and it has unexpectedly good properties as an antioxidant, particularly as to improving the properties of rubber subjected to repeated flexing and to the action of heat.

Any of the antioxidants within the scope of this invention may be employed in any type of rubber composition, such as those used for automobile tires and tubes, hose, belting, sheet and thread rubber, rubberized fabrics, molded goods, seamless dipped goods, boots and shoes, etc., whether vulcanized in a mold, in open steam, in hot air, or even vulcanized in the cold by the so-called acid process. The proportion of antioxidant may vary from about 0.1% to 5%, although either smaller or greater proportions may be found useful, and it may be added to the rubber at any desired stage of the preparation of the product. If the material to which it is added is a liquid such as a rubber cement, the antioxidant may simply be dissolved therein in a suitable small proportion, say 0.2% by weight. It is accordingly to be understood that the term "treating" is employed in a generic sense to include either the incorporation of the antioxidants into the rubber or the like by mixing them into the said material while it is in a plastic or fluid condition, or by applying them in the form of a paste, powder, or solution to the surface of a solid mass thereof.

The term "rubber" is likewise employed in the claims in a generic sense to include caoutchouc, both natural and synthetic, balata, gutta-percha, rubber isomers, and like products, whether or not admixed with fillers, pigments, or vulcanizing or accelerating agents.

It is to be understood that the scope of this invention is not to be limited by the method of preparation or materials used for illustrative purposes, for it is susceptible of numerous modifications in its various parts without exceeding the spirit and scope of the invention as defined in the appended claims.

I claim:

1. The method of retarding the deterioration of rubber which comprises treating the rubber with a double compound having the general structural formula

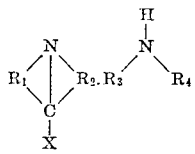

where $R_1$, $R_2$, $R_3$, and $R_4$ represent carbon rings which contain neutral or basic substituents but no others, and X represents a member of the class consisting of hydrogen and hydrocarbon radicals.

2. The method of retarding the deterioration of rubber which comprises treating the rubber with a double compound consisting of an acridine and a diaryl amine combined in an equimolar ratio.

3. The method of retarding the deterioration of rubber which comprises treating the rubber with a double compound consisting of an acridine and an acridane combined in an equimolar ratio, each component consisting solely of carbon, hydrogen, and a single nitrogen atom and containing at least one hydrocarbon group substituted on the meso carbon.

4. The method of retarding the deterioration of rubber which comprises treating the rubber with a double compound consisting of an acridine and an acridane combined in an equimolar ratio, each component consisting solely of carbon, hydrogen, and a single nitrogen atom and containing two hydrocarbon groups substituted on the meso carbon.

5. The method of retarding the deterioration of rubber which comprises treating the rubber with the double compound consisting of acridine and diphenyl amine combined in an equimolar ratio.

6. The method of retarding the deterioration of rubber which comprises treating the rubber with the double compound consisting of meso-methyl acridine and diphenyl amine combined in an equimolar ratio.

7. The method of retarding the deterioration of rubber which comprises treating the rubber with the double compound consisting of meso-methyl acridine and meso,meso-dimethyl acridane combined in an equimolar ratio.

8. A rubber composition comprising rubber and a small proportion of a compound having the general structural formula

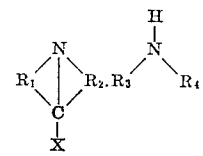

where $R_1$, $R_2$, $R_3$, and $R_4$ represent carbon rings which contain neutral or basic substituents but no others, X represents a member of the class consisting of hydrogen and hydrocarbon radicals.

9. A rubber composition comprising rubber and a small proportion of a double compound consisting of an acridine and a secondary aromatic amine combined in an equimolar ratio.

10. A rubber composition comprising rubber and a small proportion of a double compound consisting of an acridine and an acridane combined in an equimolar ratio, each component consisting solely of carbon, hydrogen, and a single nitrogen atom and containing at least one hydrocarbon group substituted on the meso carbon.

11. A rubber composition comprising rubber and a small proportion of a double compound consisting of an acridine and an acridane combined in an equimolar ratio, each component consisting solely of carbon, hydrogen, and a single nitrogen atom and containing two hydrocarbon groups substituted on the meso carbon.

12. A rubber composition comprising rubber and a small proportion of the double compound consisting of acridine and diphenyl amine combined in an equimolar ratio.

13. A rubber composition comprising rubber and a small proportion of the double compound consisting of meso-methyl acridine and diphenyl amine combined in an equimolar ratio.

14. A rubber composition comprising rubber and a small proportion of the double compound consisting of meso-methyl acridine and meso,-meso-dimethyl acridane combined in an equimolar ratio.

WALDO L. SEMON.